(No Model.)
H. METZGER.
VENT.
No. 319,007. Patented June 2, 1885.
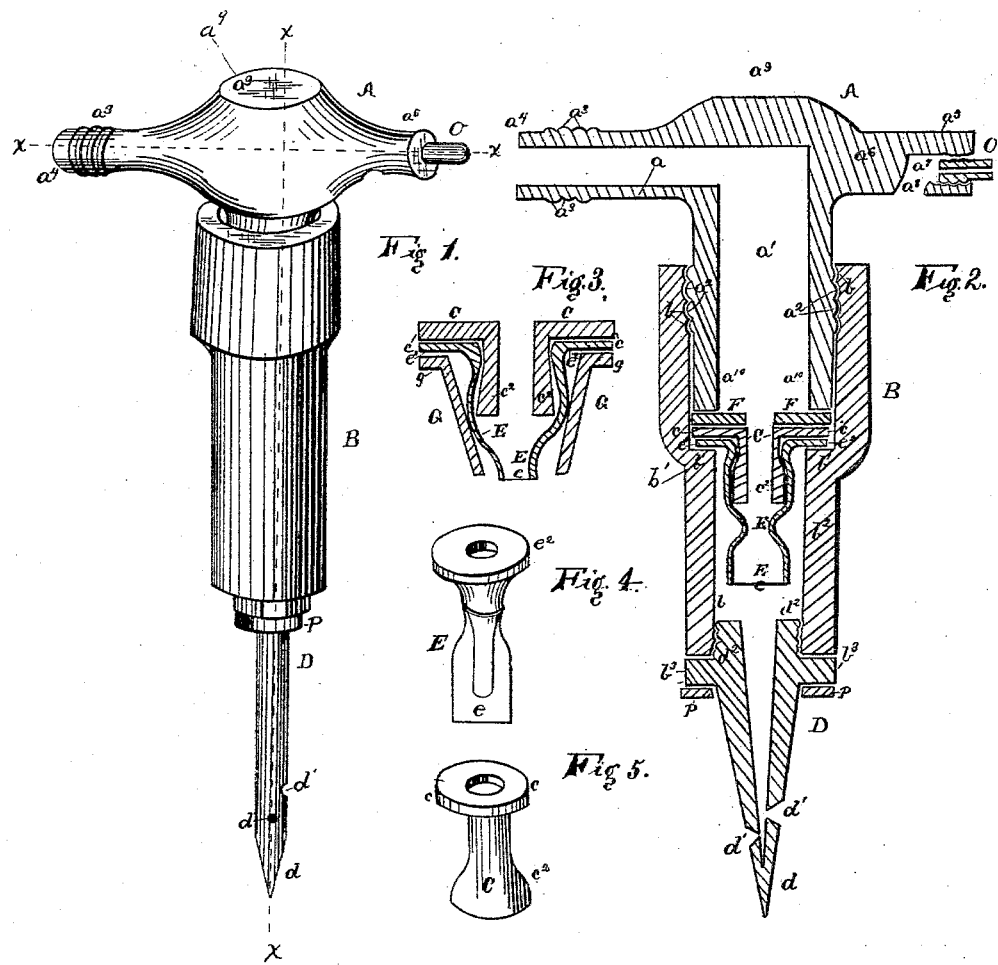
Witnesses
F. M. Clarke.
S. H. F. Clarke.
Inventor
Hermann Metzger.
By S. A. Haseltine & Bro.
Attorneys.

UNITED STATES PATENT OFFICE.

HERMANN METZGER, OF NORTH SPRINGFIELD, MISSOURI.

VENT.

SPECIFICATION forming part of Letters Patent No. 319,007, dated June 2, 1885.

Application filed April 3, 1885. (No model.)

*To all whom it may concern:*

Be it known that I, HERMANN METZGER, a citizen of the United States, residing at North Springfield, in the county of Greene and State of Missouri, have invented certain new and useful Improvements in Vents; and I do hereby declare the following to be a full, clear, and exact description of the invention, such as will enable others skilled in the art to which it appertains to make and use the same.

My invention relates to improvements in vents, the object of which is to provide a cheap, simple, and durable device for letting air into a beer or other vessel as the liquid is drawn out, or to create a pressure in the vessel, in order to make the liquid flow more freely, and at the same time to prevent the gas in the vessel from escaping, and also to prevent splitting the bung of the keg or vessel. These objects I attain by means of the device illustrated in the accompanying drawings, which form a part of this specification, in which—

Figure 1 is a perspective view of the entire device. Fig. 2 is a section of the same on the line $x\ x$. Fig. 3 is a modification in section, showing the rubber tube between two metallic funnel-shaped tubes. Fig. 4 is a view showing the rubber tube. Fig. 5 is a view showing the expansion-tube.

A is a tube, preferably made of brass, but which may be of any desired material, having an opening, $a\ a'$, for the purpose of allowing air to pass from the atmosphere into the tube D B. A' has threads $a^2$, preferably cut on the outside, for screwing it into tube D B. Part $a$ also has threads $a^3$, preferably cut on the outside, for securing the hose of a force-pump, for the purpose of pumping air into the vessel to create a pressure when desired. The end $a^4$ of the tube A is made smaller and projects beyond the threads $a^3$, so that it may be struck with a hammer or other device without injury to the threads. Part $a^6$ has the projection $a^5$, to which is secured, by any suitable means, a hollow punch, O, for the purpose of punching a hole part way through the bung of the keg or vessel, so that the part D will not split the bung when being driven, and also to make it more easily driven. Said punch is preferably made with threads on the outside to screw into the opening $a^7$, which opening has a slot or opening, $a^8$, for letting out the chips. Parts $a$ and $a^5$ are of sufficient length to serve as a handle, for the purpose of inserting and drawing tube D out of the bung when desired. The cap $a^9$ is so formed as to allow it to be struck or hammered with a hammer or other device without injury to the tube when being driven into the vessel.

D B is a tube or pipe, preferably made or formed of one piece, but which may be in two parts and of any suitable material, having threads $b$ cut on the inside, for receiving the threads $a^2$ of tube A, shoulder $b'$, for receiving the projecting flanges of the tubes C and E and the washer F, barrel $b^2$, for the purpose of receiving the tubes C and E and allowing the end $e$ to work freely, and shoulder $b^3$, for the purpose of preventing the tube from being driven too far into the bung, which shoulder is preferably formed with an elastic washer, P, which is slipped on and fits closely around part D, forming an air-tight joint where the vent enters the vessel. The part D is made small, and has a sharp point, $d$, so that it may be driven easily, and so as not to split the bung. The part D has holes $d'$, preferably made flaring outwardly, so as not to clog or fill up. These holes allow the air to pass from the tube into the vessel. When the tube D B is made in more than one part, the part D has threads $d^2$ cut on its upper end, so as to screw into the lower end of barrel $b^2$, and is also made square near its upper end, for attaching a wrench for screwing it into barrel $b^2$, which has threads cut in its lower end to receive the threads of tube $d^2$.

C is a tube having the flange $c$ to rest upon the shoulder $b'$, to hold it in place. Said tube may be made funnel-shaped, but is preferably made a little larger at its lower end, $c'$, than where it enters the flange $c$, so that the rubber tube E, when drawn over it, cannot slip or fall off.

E is a tube, made of any suitable flexible material, preferably of rubber, and is preferably made or formed with a flange at its upper end, $e^2$, so as to fit down upon the shoulder $b'$, making an air-tight joint. This tube is so formed or molded that it will stay closed at its lower end, $e$, so that no air or gas can escape through it out of the vessel, but will allow the air to be drawn into the vessel when there is a vacuum formed by drawing off the liquid; or the air may be forced into the vessel to create a pressure when desired.

Washer F may be made of any suitable flexible material, but preferably of rubber, so that when the end $a^{10}$ is screwed down upon it it presses down upon the flanges of C and E and out against the wall of tube B, thus making an air-tight joint.

There may be a tube, G, having a flange, $g$, to rest upon the shoulder $b'$, for holding the rubber tube in place; but this tube may be omitted when desired.

Having thus described my invention, what I claim as new, and desire to secure by Letters Patent, is—

1. In a vent, a tube, A, having an opening, $a$ $a'$, with threads $a^2$ $a^3$, and a cap, $a^0$, tube B, having threads $b$, shoulder $b'$, barrel $b^2$, shoulder $b^3$, tube D, having openings $d'$, flaring outwardly, sharp point $d$, and a washer, P, all substantially as shown and described.

2. In a vent, the combination of tube C, having a flange, $c$, tube E, having flange $e^2$, and end $e$, substantially as and for the purpose set forth.

3. In a vent, the combination of a tube, A, having an opening, $a$ $a'$, threads $a^2$ $a^3$, with part B, having threads $b$, shoulder $b'$, barrel $b^2$, shoulder $b^3$, tube D, openings $d'$, and a point, $d$, with tube E, having flange $e^2$, and a tube, C, having flange $c$ and lower end, $e^2$, substantially as shown and described.

4. The combination, with a hollow punch, O, having opening $a^7$ $a^8$, of a vent composed of a tube, A, having an opening, $a$ $a'$, tube D B, having shoulders $b'$ $b^3$, sharp point $d$, openings $d'$, washer P, tubes E C, and washer F, all substantially as and for the purpose set forth.

5. The combination of a tube, A, tubes D B, washer P, tubes C, E, and G, washer F, and punch O, all arranged and constructed substantially as and for the purpose set forth.

In testimony whereof I affix my signature in presence of two witnesses.

HERMANN METZGER.

Witnesses:
  S. A. HASELTINE,
  L. D. ROUTT.